Feb. 13, 1968   E. R. GLABAU   3,368,910
BISMUTH-FREE BARIUM TITANATE CERAMIC COMPOSITIONS
Filed July 29, 1964

INVENTOR.
Ernest R. Glabau
BY
Johnmoonand Kline
ATTORNEYS

United States Patent Office 3,368,910
Patented Feb. 13, 1968

3,368,910
BISMUTH-FREE BARIUM TITANATE
CERAMIC COMPOSITIONS
Ernest R. Glabau, Monroe, Conn., assignor to Vitramon, Incorporated, Monroe, Conn., a corporation of Delaware
Filed July 29, 1964, Ser. No. 385,965
4 Claims. (Cl. 106—39)

The present invention relates to novel barium titanate ceramic compositions having a high dielectric constant which shows very little variation over an extended temperature range and having an exceptionally high dielectric strength. The invention further relates to such novel barium titanate compositions which are compatible with palladium electrodes and thus are adapted for use in the production of laminate-type capacitors in which the electrodes are based upon palladium metal, and to such laminate-type capacitors.

There are a great number of different barium titanate ceramic compositions having varying electrical characteristics depending upon the nature and amount of the additives or impurities therein. Barium titanate having exceptionally high dielectric constants which exceed 2000 at room temperature are known, but such compositions are generally unsatisfactory for use in components which must operate under alternating conditions of heat and cold since the dielectric constant is unstable and a high degradation of the dielectric constant takes place under these conditions with resultant failure of the component. Thus it is more important to provide a barium titanate composition which has a relatively high dielectric constant which is temperature stable than to provide a higher dielectric constant which will not withstand temperature variations.

It is also important that the barium titanate compositions have a high voltage breakdown strength of at least 500 volts per mil so that they may be used in the form of very thin sheets for the production of minute components adapted for use for high voltage applications.

United States Patent No. 3,068,107 relates to barium titanate-bismuth stannate compositions having electrical characteristics of the type and degree desired for the present compositions, but the compositions of the patent have the disadvantage that they contain residual bismuth oxide and thus cannot be used in laminate-type capacitors having palladium electrodes. While platinum electrodes function perfectly with such compositions, platinum is very expensive and thus unavailable for many uses where cost is of primary importance. Palladium is only half as expensive as platinum but it appears that palladium combines with bismuth oxide and forms a compound that possesses a sharp dimensional change which causes the combination to shatter or crumble or form discontinuous particles, thereby destroying or at least substantially reducing the electrical contact between the electrodes and the dielectric composition.

Thus it is an object of the present invention to produce barium titanate compositions which have a high dielectric constant which is relatively stable over an extended temperature range and which have a high voltage breakdown strength of at least 500 volts per mil but which are free of any bismuth compound.

It is another object of this invention to produce laminate-type capacitors comprising alternating layers of the present bismuth-free ceramic compositions and palladium electrodes, said capacitors being stable against degradation of their electrical properties due to any reaction between the palladium electrodes and the ceramic composition.

These and other objects and advantages of the present invention will be clear to those skilled in the art in the light of the following disclosure, including the drawing, in which.

Figure 1:
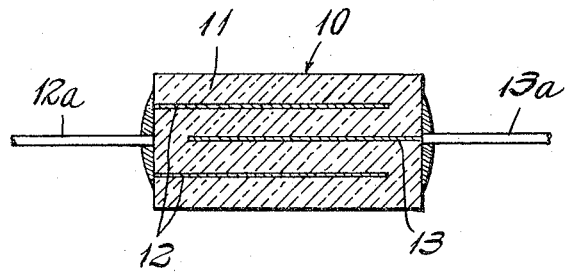
FIG. 1 is a diagrammatic cross-section, to an enlarged scale, of a laminate-type capacitor produced according to the present invention.

The bismuth-free compositions of the present invention comprise a major amount by weight of barium titanate and minor amounts by weight of tin oxide and/or titanium oxide, at least one oxide from the group consisting of cerium, neodymium, praseodymium and uranium oxides, at least one stannate from the group consisting of nickel, barium, strontium, calcium and magnesium stannates and at least one alkaline earth zirconate or hafniate from the group consisting of barium, strontium, calcium and magnesium zirconates and hafniates.

The effective proportions of the above ingredients are as follows.

| Ingredients: | Mole percent |
|---|---|
| Barium titanate | 85 to 95 |
| Tin and/or titanium oxide | 3 to 6 |
| Cerium oxide or substitute | 1 to 5 |
| Stannate | 0.5 to 2 |
| Zirconate or hafniate | 0.5 to 2 | provided that the mole percent ratio of the cerium oxide or substitute to the tin oxide and/or titanium oxide ranges from 0.25–0.85 to 1, and preferably about 0.45 to 1.

It is not known how the ingredients of the present compositions cooperate to produce the desired electrical properties but it has been found that it is not possible to merely replace the bismuth stannate of the compositions of aforementioned U.S. Patent No. 3,068,107 with a different stannate and retain the desired electrical characteristics.

The barium titanate ceramic compositions of the present invention have a dielectric constant of between 1500 and 2000 and most frequently between 1650 and 1800. They have a coefficient of capacitance or dielectric constant which varies less than plus or minus 15% from a measurement at 25° C. as the temperature is lowered to −55° C. or raised to +125° C. They have a voltage breakdown strength of at least 500 volts per mil. These properties are highly advantageous for ceramic compositions adapted for all types of electrical uses where semiconductor materials are required, but have been found most advantageous for the production of laminate-type capacitors which employ palladium electrodes because of the inertness and compatibility of the present ceramics with palladium.

The following examples are given by way of illustration and should not be considered limitative:

Example 1

| Ingredients: | Mole percent |
|---|---|
| Barium titanate | 91.44 |
| Tin oxide | 2.33 |
| Titanium oxide | 2.33 |
| Cerium oxide | 1.97 |
| Nickel stannate | 0.94 |
| Calcium zirconate | 0.99 |

Example 2

| Ingredients: | Mole percent |
|---|---|
| Barium titanate | 91.46 |
| Tin oxide | 4.64 |
| Cerium oxide | 1.98 |
| Nickel stannate | 0.93 |
| Calcium oxide | 0.32 |
| Hafnium oxide | 0.67 |

The compositions of the above examples may be formed into dielectric slips for the production of cast single layer capacitors by mixing in a ball mill, adding a suitable resinous binder material such as a polymethyl methacrylate resin and one or more volatile solvents, casting the solution onto a flat surface such as glass, drying at about 70° C. and then firing in an oven at a temperature of between about 2000° F. and 2600° F. for less than about three hours. The firing temperature is preferably between 2400° F. and 2450° F.

However, more importantly to the present invention, these compositions may be ball milled, mixed with the resinous binder material and volatile solvent, and formed into laminate-type capacitors by the methods defined in U.S. Patents Nos. 2,779,975 and 3,130,356 using palladium or, if desired, platinum electrodes in place of the silver electrodes of the patents and using a final firing temperature in the area of 2000° F. to 2600° F. in place of the lower firing temperatures used in the patents.

According to the laminate process, a layer of the barium titanate composition is deposited on a surface such as glass and is treated to remove excess solvent to form a layer having the desired thickness. The layer is then printed upon in the desired areas with a palladium or platinum paste in any suitable manner, such as by use of the silk screen process, to form an electrode. Then subsequent layers of the barium titanate composition and electrode paste are spread over the first barium titanate layer to seal the electrodes therebetween, the excess solvent is removed therefrom and the unit is dried and fired to form a capacitor. A series of alternate electrodes and barium titanate layers may be similarly deposited to form a capacitor having as many electrodes as desired up to about 30 or more to produce units having the desired capacitance.

Figure 2:
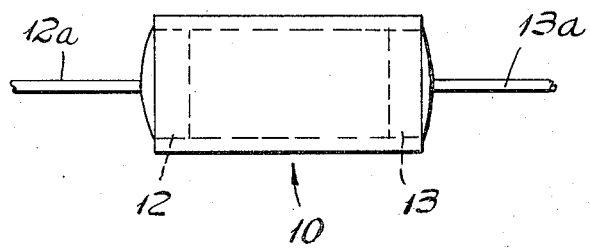
FIG. 2 is a plan view of a laminate-type capacitor produced according to the present invention.

FIGURE 1 of the drawing illustrates a cross-section of a laminate-type capacitor 10 having four barium titanate layers 11 and three palladium electrodes 12 and 13, the electrodes being so printed that alternate electrodes 12 are joined to terminal lead 12a and electrode 13 is joined to terminal lead 13a. A plan view of the capacitor of FIG. 1 is shown in FIG. 2 with broken lines to illustrate the position of electrodes 12 and 13 therein.

According to the embodiment illustrated by the figures of the drawing, the layers 11 of dielectric ceramic composition between the electrodes may have a thickness of about 0.002 to 0.005 inch whereas the thickness of the top and bottom surface layers of the dielectric ceramic composition is far less critical and may be in the area of about 0.1 to 0.005 inch and preferably about 0.015 inch. The electrodes 12 and 13 extend to the opposite leads 12a and 13a and as shown by FIG. 2 do not extend to the side edges of the unit. Thus, in cases where the capacitor illustrated by FIG. 2 of the drawing has length and width of about 0.25 inch, the electrodes are somewhat less than 0.25 inch in length and width so that they contact only one lead terminal and do not extend to the side edges of the unit, as illustrated.

While the compositions of the present invention are referred to as containing barium titanate, metal stannate and metal zirconate or metal hafniate, it should be understood that the initial batch mixture used to form the present capacitors need not contain these specific materials but rather may contain reactive materials in stoichiometric amounts such that these specific materials will be formed in the firing step, as is conventional practice in the art. For instance, in place of barium titanate or nickel stannate, one may use stoichiometric amounts of barium oxide and titanium dioxide or stoichiometric amounts of nickel oxide and tin oxide respectively, but of course sufficient excess titanium oxide and/or tin oxide must be included to provide the free tin oxide and/or titanium dioxide required by the composition. Also, the metal zirconate or metal hafniate may be included in the form of stoichiometric amounts of metal oxide and zirconium oxide or hafnium oxide, as shown in Example 2.

Variations and modifications may be made within the scope of the claims and portions of the improvements may be used without others.

I claim:
1. The method of preparing a barium titanate ceramic which is substantially free of bismuth and substantially inert to palladium and which has a high dielectric strength, a voltage breakdown strength of at least 500 volts per mil and a high dielectric constant which varies by not more than plus or minus 15 percent when the temperature is lowered from 25° C. to −55° C. and raised from 25° C. to 125° C. which comprises mixing from 85 to 95 mole percent of barium titanate, from 3 to 6 mole percent of at least one first oxide from the group consisting of tin oxide and titanium oxide, from 1 to 5 mole percent of at least one second oxide from the group consisting of cerium, neodymium, praseodymium and uranium oxides, from 0.5 to 2 mole percent of at least one stannate from the group consisting of nickel, barium, strontium, calcium and magnesium stannates, and 0.5 to 2 mole percent of at least one compound from the group consisting of alkaline earth zirconates and hafniates, the mole percent ratio of the said first oxide to the said second oxide being within the range of 1:0.2 to 0.85, depositing said mixture in the form of a thin layer upon a suitable support and firing said layer at a temperature of between about 2000° F. to 2600° F. for a period of time sufficient to form said ceramic.

2. The method of preparing a barium titanate ceramic which is substantially free of bismuth and substantially inert to palladium and which has a high dielectric strength, a voltage breakdown strength of at least 500 volts per mil and a high dielectric constant which varies by not more than plus or minus 15 percent when the temperature is lowered from 25° C. to −55° C. and raised from 25° C. to 125° C. which comprises mixing about 91.5 mole percent of barium titanate, about 4.6 mole percent of at least one first oxide from the group consisting of tin oxide and titanium oxide, about 2 mole percent of at least one second oxide from the group consisting of cerium, neodymium, praseodymium and uranium oxides, about 1 mole percent of at least one stannate from the group consisting of nickel, barium, strontium, calcium and magnesium stannates, and about 1 mole percent of at least one compound from the group consisting of alkaline earth zirconates and hafniates, the mole percent ratio of the said first oxide to the said second oxide being about 1:0.45, depositing said mixture in the form of a thin layer upon a suitable support and firing said layer at a temperature of between about 2000° F. to 2600° F. for a period of time sufficient to form said ceramic.

3. A ceramic dielectric composition which is substantially free of bismuth and substantially inert to palladium and which has a high dielectric strength, a voltage break down of at least 500 volts per mil and a high dielectric constant which varies by not more than plus or minus 15% when the temperature is lowered from 25° C. to −55° C. and raised from 25° C. to 125° C., which comprises 85 to 95 mole percent of barium titanate; 3 to 6 mole percent of at least one first oxide from the group consisting of tin oxide and titanium oxide; from 1 to 5 mole percent of at least one second oxide from the group consisting of cerium, neodymium, praseodymium and uranium oxides; from 0.5 to 2 mole percent of at least one stannate from the group consisting of nickel, barium, strontium, calcium and magnesium stannates; and from 0.5 to 2 mole percent of at least one compound from the group consisting of alkaline earth zirconates and hafniates, the mole percent ratio of said first oxide to said second oxide being within the range of 1:0.2 to 0.85.

4. A ceramic dielectric composition which is substantially free of bismuth and substantially inert to palladium and which has a high dielectric strength, a voltage breakdown of at least 500 volts per mil and a high dielectric constant which varies by not more than plus or minus 15% when the temperature is lowered from 25° C. to −55° C. and raised from 25° C. to 125° C. which comprises about 91.5 mole percent of barium titanate, about 4.6 mole percent of at least one first oxide from the group consisting of tin oxide and titanium oxide; about 2 mole percent of at least one second oxide from the group consisting of cerium, neodymium, praseodymium and uranium oxides; about 1 mole percent of at least one stannate from the group consisting of nickel, barium, strontium, calcium and magnesium stannates; and about 1 mole percent of at least one compound from the group consisting of alkaline earth zirconates and hafniates, the mole percent ratio of said first oxide to said second oxide being about 1:0.45.

References Cited

UNITED STATES PATENTS

| | | | |
|---|---|---|---|
| 2,520,376 | 8/1950 | Roup et al. | 106—39 |
| 2,836,501 | 5/1958 | Crownover | 106—39 |
| 2,789,061 | 4/1957 | Coffeen | 106—39 |
| 2,980,546 | 4/1961 | Plessner et al. | 106—39 |
| 3,103,442 | 9/1963 | Zlotnick | 106—39 |

HELEN M. McCARTHY, *Primary Examiner.*

W. R. SATTERFIELD, *Assistant Examiner.*